Patented May 25, 1937

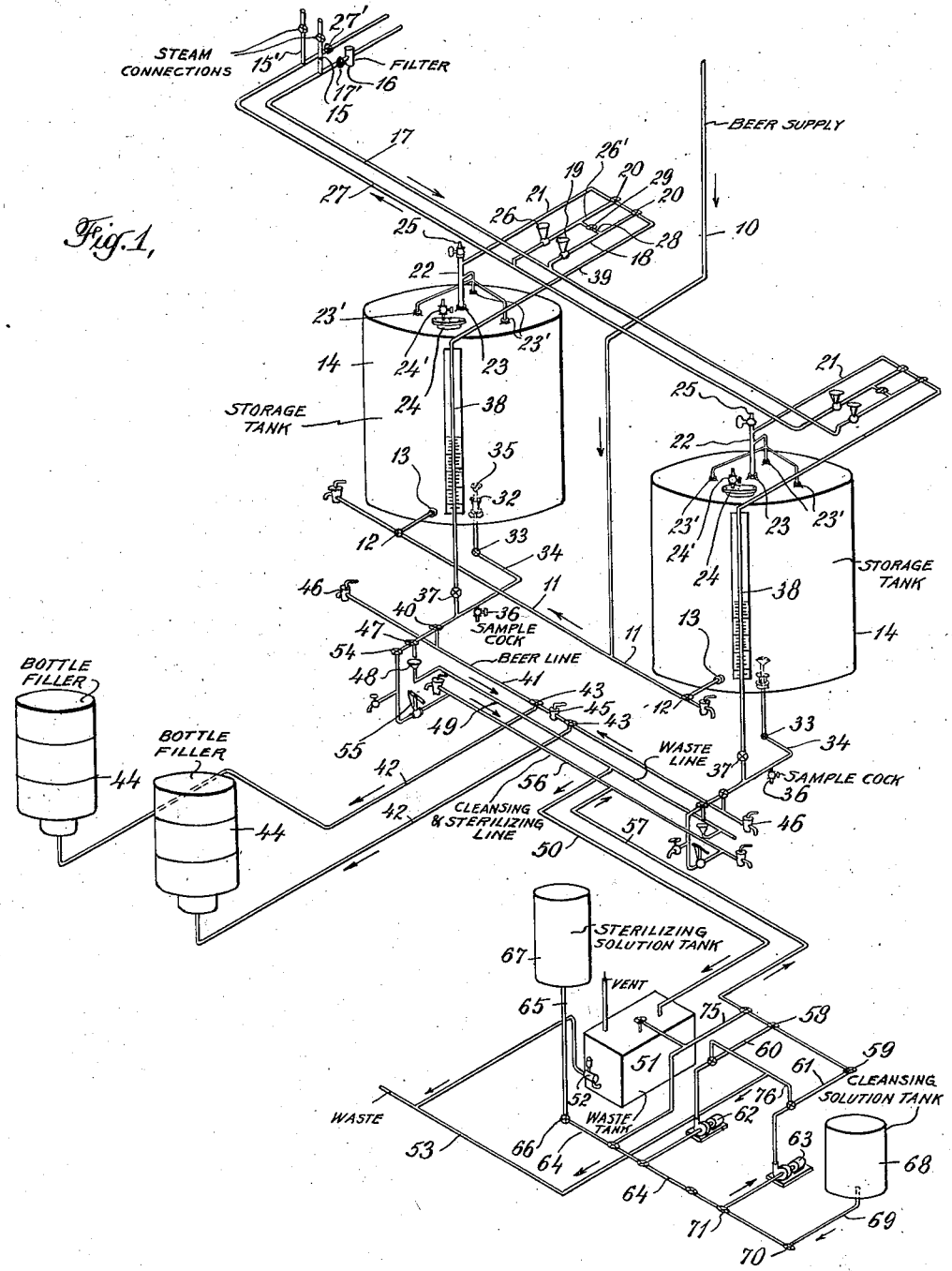

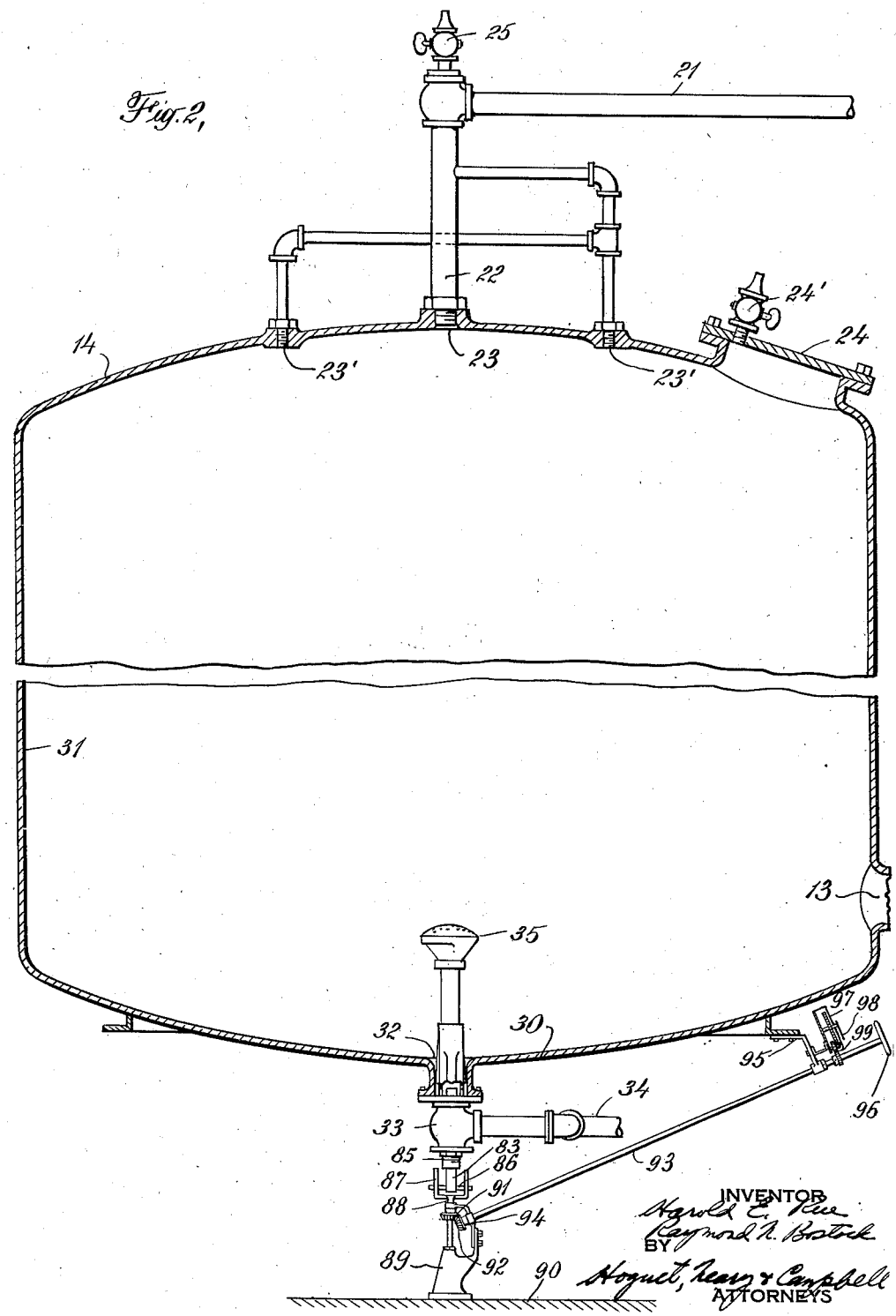

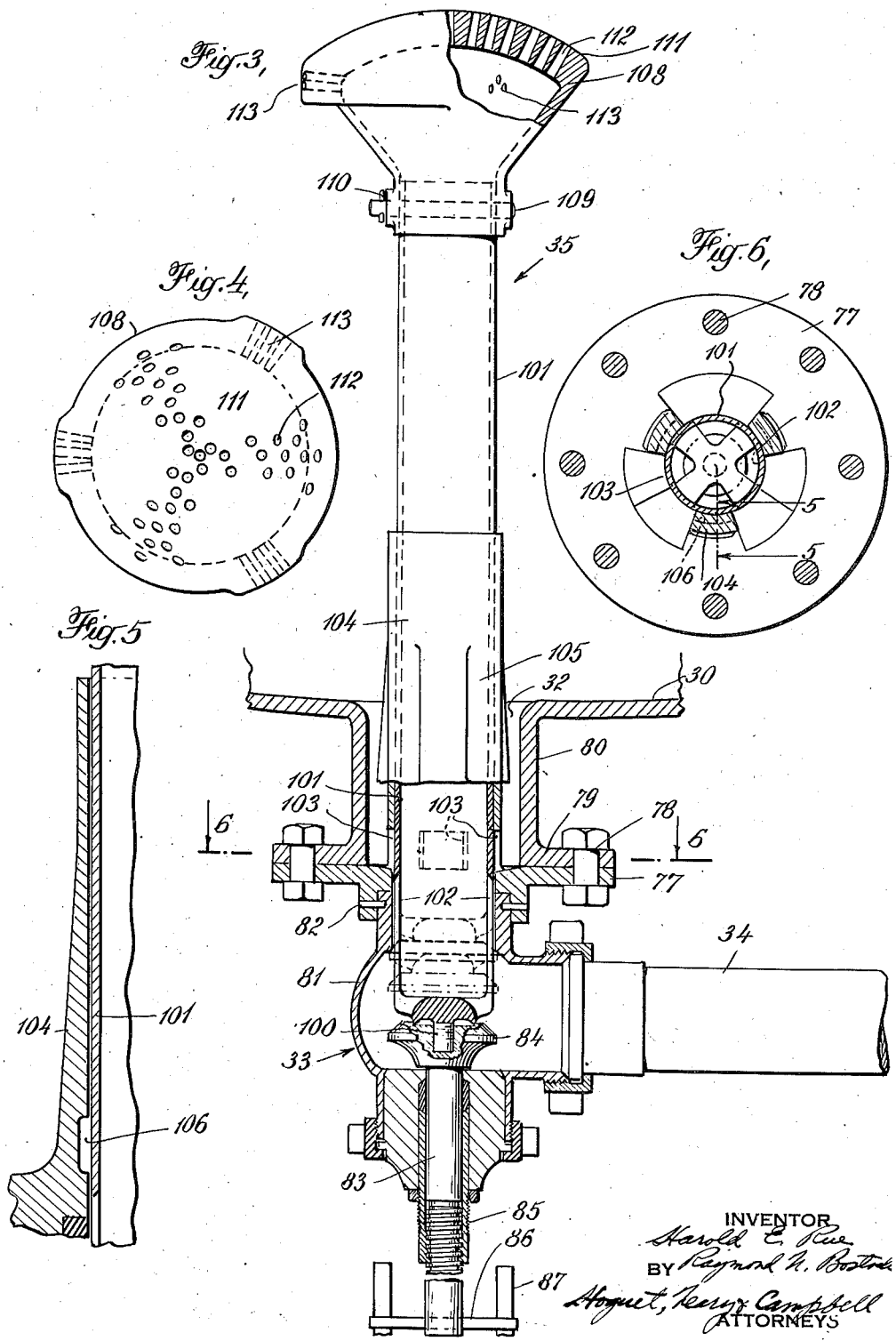

2,081,339

UNITED STATES PATENT OFFICE 2,081,339

LIQUID STORAGE TANK

Harold E. Rue, West Orange, and Raymond N. Bostock, Montclair, N. J., assignors to Hoffman Beverage Company, Newark, N. J., a corporation of New Jersey Application September 30, 1935, Serial No. 42,804

12 Claims. (Cl. 99—269)

This invention relates to liquid storage tanks and to means for cleansing or sterilizing the same, and has particular reference to storage tanks for beer and other beverages, although the invention is not limited to that use.

In order to prevent beer from being infected as the result of an unsterile condition of the storage tank and beer conduits leading thereto and therefrom, it is necessary to sterilize these conduits and storage tank preparatory to admitting beer to them. Beer, due to its nature and relatively low alcoholic content, forms an excellent medium for the incubation of organisms, so that beer is readily infected and soon spoils unless it is properly handled and stored. Much of the infection of beer is due to contamination of the storage tank and its appurtenant parts and the principal source of such contamination is the outside air, so much so, that a freshly cleansed and sterilized storage tank exposed to the outside air for only a few moments after cleansing or sterilization may be sufficiently contaminated to infect and spoil the next batch of beer stored in the tank.

According to the present invention, a storage tank especially adapted for storing beer is provided, which remains sterile after cleansing or sterilization and which is fitted with novel cleansing or sterilizing means enabling the cleansing or sterilization of the interior of the tank without requiring the tank to be opened to the outside air for that purpose, and without requiring the introduction of brushes and other extraneous scouring means inside of the tank.

More particularly, the invention comprises an hermetically sealed storage tank of porcelain-lined steel or other suitable material having a beer inlet in its side wall adjacent the bottom and an outlet in the center of its bottom, in which outlet is located a rotatable cleansing nozzle or multi-nozzle device projecting upwardly into the tank and having a generally mushroom or dome-shaped head provided with spaced nozzles so directed that a cleansing or sterilizing liquid forced through the nozzles under pressure issues from them in the form of powerful jets which impinge on the entire inside surfaces of the tank above the normal liquid line with a scouring action as the head is rotated from outside of the tank. The cleansing or sterilizing liquid, after impingement, flows over the remaining inside surfaces of the tank with cleansing or sterilizing effect. The nozzles in the head are so arranged, geometrically, that when the head is rotated with uniform angular velocity, each unit of tank space impinged upon receives the same volume of liquid as every other such unit of surface, regardless of location. The cleansing or sterilizing liquid is supplied to the nozzle through a manifold having connected thereto not only the cleansing or sterilizing liquid pipe, but also beer outlet and waste pipes, each of which is controlled by a valve. By means of the beer outlet valve, the flow of beer from the tank may be controlled. The waste or spent cleansing or sterilizing liquid may be withdrawn from the tank by means of the waste valve. By means of the cleansing or sterilizing liquid valve, the flow of this liquid into the tank may be controlled. Beer leaving the tank and cleansing or sterilized liquid entering or leaving the tank do so through the valve attached to the lower end of the multi-nozzle device.

The sterilizing liquid is preferably a relatively strong chlorine solution or the like and the cleansing liquid a relatively weak chlorine solution or the like, and these are used with discrimination as occasion may require. All parts of the interior of the tank above the normal liquid line, and the inlet, are cleansed and sterilized by the powerful spray or geyser action of the liquid issuing from the main nozzle having strong scouring action which is more effective than filling the tank with quiescent cleansing liquid and then draining the tank, and much less of the relatively expensive cleansing liquid is used. Those portions of the interior tank surfaces below the normal liquid line are cleansed and sterilized by the action of the cleansing liquid as it washes down over them, after impingement on the surfaces above the normal liquid line.

The beer is maintained in the tank under pressure of a non-oxidizing gas. The pressure at the bottom of the tank is kept constant, automatically, regardless of the rise and fall of the beer level in the tank, and this gas pressure is utilized to force the beer out of the tank as it is withdrawn. Also, it assists in minimizing foaming and frothing of the beer as the latter is led into the tank. The cleansing or sterilizing spray utilized for cleansing or sterilizing the tank also sterilizes the gas remaining therein, so that the gas need not be withdrawn and replaced because of cleansing or sterilizing and there is little waste of the gas except that slight amount which is dissolved in the cleansing or sterilizing liquid.

It will be seen that with the present invention beer and other beverages may be kept for indefinite periods in a tank without infection from within the tank, and that the tank may be cleansed or sterilized quickly, easily and effectively without opening the tank for that purpose, and that therefore the tank will not be infected from the outside air. While the tank is especially adapted for storing beer it is not limited to that use but may be employed for storing any liquids whose sterile preservation during storage is necessary because of their nature or is desirable in the interest of sanitation.

For a more complete understanding of the invention, reference may be had to the accompanying drawings, in which Figure 1 is a schematic piping diagram for the liquid storage tanks of this invention, and means for cleansing the tanks;

Figure 2 is an axial section through one of the storage tanks;

Figure 3 is an enlarged axial section through the lower portion of one of the storage tanks, showing the cleansing nozzle and the discharge control valve mechanism thereof;

Figure 4 is a plan view of the spray head of the cleansing nozzle;

Figure 5 is a fragmentary cross-section through the nozzle stem, as seen along the line 5—5 of Figure 6; and Figure 6 is a transverse section through the base of the nozzle, as seen along the line 6—6 of Figure 3.

Referring to Figure 1 of the drawings, numeral 10 designates the beer supply pipe leading from the brewing means or the like, and branching into two or more pipes 11, each of which leads through a three-way valve 12 to an inlet 13, which is preferably located in the side of the storage tank 14 near its bottom to minimize turbulence of the beer and its resultant frothing and foaming. Two or more of the storage tanks 14 with appropriate connections are preferred for storage purposes and also in order that one may be sterilized or cleansed while the other is in use.

A supply of carbon dioxide gas is maintained under pressure within each storage tank 14 at all times and when the beer is introduced into the tank, this gas pressure assists in reducing frothing and foaming thereof. The carbon dioxide gas is supplied through filter 16, pipes 17 and 18, automatic pressure-control valve 19, three-way hand valves 20 and pipes 21 and 22 into the top of storage tank 14, through opening 23. Sealed outlets 23' at the top of tank 14 are connected by means of relatively small diameter pipes with pipe 22. Sealed manhole 24 at top of tank 14 is provided with petcock 24', at its highest point. Before the first filling of tank 14 with non-oxidizing gas it is necessary to expel all air. This is accomplished by completely filling tank with sterilizing liquid from the bottom and expelling air through openings 23' to pipe 22 and safety valve 25 which is manually operated, until tank has been completely purged of air. Petcock 24' on manhole 24 of tank 14 is manually operated to purge off any air entrapped at the top of the manhole. In order to purge air from gauge glass 38, pipe 39 and pipe 21, sterilizing liquid, simultaneously with filling tank 14, is allowed to flow through them in a direction toward safety valve 25 and released with the manual operation of safety valve 25.

The gas supply line 21 is connected through one of the three-way hand valves 20 and through a second automatic pressure control valve 26 by pipe 26' to carbon dioxide gas return line 27. Control valve 26 operates in a direction opposite to control valve 19, the latter passing gas from feed line 17 in accordance with a drop in predetermined pressure of the gas in the tank, and the former passing gas from the tank when its pressure exceeds a predetermined maximum. In this way the pressure of the gas in the tank 14 is automatically controlled so that the total pressure at the bottom of the tank is maintained constant, regardless of the rise and fall of the level of the beer in the tank 14. A by-pass 28, controlled by valve 29, connects pipes 18 and 26' for cleansing purposes and its operation will be described. Steam supply and vent connections 15 and 15' are provided for pipes 17 and 27, respectively, for a purpose to be described.

The bottom 30 of the tank 14 merges smoothly into the side walls 31 and is concave, so that the beer flows to outlet 32 connected to discharge control valve 33 having outlet pipe 34. A cleansing nozzle 35 projects upwardly through outlet 32 into the tank 14 and will be described in detail. Pipe 34 is fitted with a sampling cock 36 and is connected through hand valve 37 with the calibrated gauge glass 38 connected at its upper end by pipe 39 and through three-way valves 20, pipe 21, pipe 22 and opening 23 to tank 14, so that beer entering gauge glass 38 from below is under the same gas pressure as the beer in storage tank 14, and the glass accurately indicates the beer level in tank 14.

The control valve 33, controlling the withdrawal of the liquid from the storage tank 14, is connected by pipe 34, through three-way valve 40 to beer outlet pipe 41, which has two branches 42, each controlled by a three-way valve 43 and each leading to a machine 44 for filling and sealing the beer in bottles, or other containers, under sterile conditions. A valve 45 is interposed between valves 43 in beer outlet pipe 41 to disconnect the communication between branch pipes 42. The ends of beer outlet pipe 41 are each provided with a cock 46 for sampling purposes, drainage, or the like. Pipe 34 is also provided with a three-way waste valve 47, which discharges into funnel 48 connected to waste pipe 49 leading through pipe 50 to waste tank 51. This waste tank is provided with a waste pump 52 for discharging the contents of the tank to a sewer 53 or other waste line.

Pipe 34 is also provided with another valve 54 connected through quick-opening valve 55 to cleansing or sterilizing pipe 56, which supplies both storage tanks 14, and is supplied by pipe 57 connected through three-way valve 58 and valve 59, and respective pipes 60 and 61 to a sterilizing solution pump 62 and to a cleansing solution pump 63. The sterilizing solution pump 62 is connected to pipe 64 in turn connected by pipe 65 through valve 66 to a tank 67 containing a suitable sterilizing solution. The pump 63 draws cleansing liquid from tank 68 through pipes 69 and 64 and valves 70 and 71. Pipes 57 and 64 are connected by by-pass 75 to waste tank 51, and both the cleansing and sterilizing solution lines 61 and 60 are cross-connected by by-pass 76 to waste pipe 52.

The storage tank 14 is of steel, aluminum, or other suitable material and is preferably porcelain-lined to facilitate cleansing. It is provided with the pipe connections described and with the calibrated gauge glass 38, whereby the beer level in the tank is indicated. The cleansing nozzle 35 extending upwardly into the tank from the bottom is illustrated in enlarged detail in Figure 3. This cleansing nozzle 35 includes a plate 77 secured by bolts 78 to a companion flange 79 formed on the lower end of a tubular extension 80 on the bottom 30 of the storage tank 14. Secured in a recess in plate 77 by means of pins 82 is body 81 of the control valve 33, which is preferably an angle valve of the so-called sanitary type, the stem 83 of which carries the valve disc 84 at one end and is threaded through a valve packing bushing 85 at its other end.

The valve stem 83 is fitted with a cross bar 86 which slides vertically in a forked yoke 87 as the valve disc 84 moves up and down when the valve stem 83 is rotated. As is illustrated in Fig. 2, the yoke 87 is secured to and is rotated by a vertical shaft 88 journaled in a step bearing in bracket 89 supported on a base or platform 90, or the like. Shaft 88 is fitted with a bevel gear 91 meshing with bevel gear 92 secured on one end of operating shaft 93 which is journaled at that end in a bracket 94 secured to bearing bracket 89 and at the other end in a bearing bracket 95 secured to the storage tank 14. The free end of valve-operating shaft 93 is fitted with a hand wheel 96 adjacent the dial 97 having a pointer 98 rotated by the gears 99 from shaft 93 as the latter is rotated by hand wheel 96. The dial 97 is provided with inscriptions indicating the open or closed condition of the valve 33 and of the ports of the cleansing nozzle 35.

The upper surface of the valve disc 84 is tapped to accommodate a threaded pin 109 on the lower end of the tubular stem 101 of the cleansing nozzle 35. The lower end of tubular stem 101 is slotted vertically at spaced points to provide a plurality of spaced ports 102 which are adapted to function with ports 103 in the lower end of tubular sleeve 104 formed integrally with plate 77 and serving as a bearing for the tubular stem 101. As is illustrated in Figures 3 and 6, the tube 101 is fluted on its outer surface to provide surface channels 105 through which the sterilizing solution has ready access to the bearing between tube 101 and sleeve 104 for sterilizing the same. Annular groove 106 is provided in sleeve 104 for admitting the liquids to ports 102 when ports 102 and 103 are not aligned, because in certain relative angular positions of the ports 102 and 103 the tube 101 partially closes port 103, so that, if groove 106 were not provided, there would not be a sufficient port opening to drain the tank at the proper rate. Ports 102 and 103 are never in precise angular registry, because there are four ports 102 and only three ports 103. Accordingly, the liquid within the tank may flow freely through outlet 32 formed by the tubular extension 80 on bottom 30 of tank 14 into ports 103 and 102 when they are aligned horizontally, and continue to pipe 34 through valve 33.

The upper end of the tubular stem 101 carries the mushroom- or dome-shaped spray head 108 of the nozzle 35, which is secured in place by a pin 109 locked in position by a cotter 110. The upper surface 111 of the head 108 is convex and is provided at geometrically spaced intervals with a plurality of diverging nozzle openings 112, which are preferably divided into three groups spaced 120° apart in the manner illustrated in Figure 4. The center line of the nozzle openings 112 are normal to the outer surface of the mushroom-shaped head 108. The geometrical arrangement of the nozzle openings 112 is such that the jets of liquid issuing therefrom impinge upon each unit of area of the inner surface of the top of the tank 14 and the side wall of tank 14 above the normal liquid level, when nozzle 35 is rotated. The groups of horizontal nozzle openings 113 are located intermediate the upper nozzle openings 112 as is indicated in Figure 4, and diverge in a lateral as well as in an upward direction so as to impinge over a substantial area of the side wall of the tank 14 at the level of the beer inlet 13, so that the latter is also cleansed by the lateral spray issuing from nozzle openings 113.

In operation, the beer or other liquid is supplied by means of pipes 10 and 11 to one or more of the storage tanks 14, the supply of beer to the several tanks being controlled by the individual valves 12. The beer flows into each of the tanks through the lateral openings 13 without material frothing or foaming due to the position of the opening 13 and also due to the pressure of the carbon dioxide gas on the surface of the beer entering the tank 14, this gas being supplied from feed pipe 17, in accordance with pressure requirements, by automatic valve 19 to pipe 18, past open valves 20 and by way of pipes 21 and 22 to inlet 23 in the top of the tank 14. The pressure of carbon dioxide gas also serves to force the beer or other liquid out of the tank when the discharge valves are opened.

In order to withdraw beer from storage tank 14, hand wheel 96 is rotated until pointer 98 designates the inscription on dial 97 which indicates that the valve 33 is open and ports 102 and 103 are aligned so as to be open, which is substantially the mid-position of the valve disc 84 indicated in dotted lines in Figure 3. In this valve position beer or other liquid flows from outlet 32 through registering ports 102 and 103 past valve disc 84 and into pipe 34 which, if valve 40 is open, supplies beer through pipes 41 and 42 to the bottle-filling and sealing machines 44, or the like. Samples of beer for test purposes or the like may be withdrawn by means of cock 36. In order to close valve 33, hand wheel 96 is rotated so that pointer 98 designates on dial 97 an inscription which indicates that valve 33 is closed and ports 102 and 103 are open, which is the uppermost position for the valve disc 84, indicated in phantom in Figure 3.

When it is desired to cleanse and sterilize one of the storage tanks 14, hand wheel 96 is rotated until pointer 98 designates an inscription on the dial 97 which indicates that the valve 33 is open and ports 102 and 103 are closed, which is the lowermost position for valve disc 84, indicated in solid lines in Figure 3. A sterilizing solution, preferably strongly chlorinated water of the order of twenty parts chlorine per million parts of water, is then pumped from sterilizing solution tank 67 by means of pump 62 through pipes 56 and 57 through quick-opening valve 55, and open valves 54 and 33 into tubular stem 101 of nozzle 35 and into spray head 108, from which it issues through nozzle openings 112 and 113 in the form of a powerful geyser-like spray, which scours thoroughly the upper portion of the tank 14 including the inside surface of the top and the inside surface of the upper portions of the side wall 31 and the lower portions of the side wall 31 at the level of the inlet 13 as well as inside the same, the liquid flowing down the walls and over the bottom 30 of the tank 14. The spray from upper nozzle openings 112 impinge the walls above the normal beer level therein. While the spray is issuing from the spray head 108 hand wheel 96 is rotated, so as to rotate the spray head 108 back and forth through an angle of about 130°, so that the spray issuing therefrom also laterally sweeps the interior of the tank so that every unit of area of the interior of the tank is scoured and sterilized in one operation by impingement. At the same time valve 37 is opened and valve 29 is closed, so that the sterilizing liquid is also forced through gauge glass 38, pipe 39, open valves 20, and pipes 21 and 22 into the tank 14, whereby the gauge glass 38 and the connections thereto as well as pipes 21 and 22 are sterilized.

After the predetermined volume of sterilizing solution deemed necessary to thoroughly sterilize the interior of the tank has been supplied thereto and has collected in the bottom thereof, the pump 62 is shut off and the spent solution drained from the tank 14 by rotating hand wheel 96 to the proper designation on dial 97 indicating that the ports 102 and 103 are in registry, which is when the disc 84 of valve 33 is in the mid-position indicated in dotted lines in Figure 3. With the ports 102 and 103 aligned and with valve 33 still open, the spent sterilizing liquid flows from tank 14 through pipe 34 and past open valve 47, valve 54 being first closed. The spent sterilizing liquid passes through valve 47 into the funnel 48 and through pipes 49 and 50 to the waste tank 51 in which it accumulates until it is pumped by means of waste pump 52 to the sewer or waste line 53.

Then valve 47 is closed and valve 54 is reopened and a cleansing solution, preferably mildly chlorinated water of the order of one part chlorine per million parts of water, is supplied from tank 68 through pipes 69 and 64 to cleansing solution pump 63, which forces it under pressure through pipes 61, 57 and 56, valves 55, 54 and 33, and into the spray nozzle 106, ports 102 and 103 having been previously placed out of registry in the manner described. The cleansing solution also flushes the gauge glass 38 in the manner described. By means of hand wheel 96 the nozzle 108 is rotated through an angle of approximately 130° during the cleansing solution spraying operation in the manner described and the spent cleansing solution, after the cleansing operation, is drained from the storage tank 14 in the manner described in connection with the draining of the spent sterilizing solution, these sterilizing and cleansing operations being repeated as often as is deemed necessary to secure complete sterilization and cleansing.

During the sterilizing and cleansing operations, the storage tank 14 remains filled with an atmosphere of carbon dioxide gas under pressure and accordingly this gas is also sterilized during the sterilizing operation, so that it need not be withdrawn but is used over and over, only a slight proportion of it being lost due to absorption in the sterilizing and cleansing solutions.

The carbon dioxide gas feed and return lines 17 and 27, the pressure control valves 19 and 26, and pipes 18 and 26' may be sterilized and cleansed by pressure steam supplied through steam connection 15. The valves 17' and 27' are closed, valves 19 and 26 are held or propped open, by-pass valve 29 is opened and valves 20 controlling pipes 21 and 39 are closed. Steam is then supplied by opening steam connection 15 and steam flows through pipe 17, valve 19, pipe 18, by-pass 28, pipe 26', valve 26 and pipe 27 to steam vent 15', so that all of these parts are sterilized and cleansed under steam pressure without opening them to the atmosphere. In order to refill the tank 14 with beer the hand wheel 96 is rotated until pointer 98 designates on dial 97 the legend indicating that valve 33 is in mid-position and ports 102 and 103 are in registry and valves 40, 47, 54 are closed. Then the beer is supplied from pipes 10 and 11 to the tank through open valve 12 and inlet 13, the beer rising in tank 14 from the bottom so that frothing and foaming is minimized, this action being aided by the pressure of the $CO_2$ gas on the surface of the rising beer. Beer is supplied to gauge glass 38 by opening valve 37.

It will be seen that with the arrangement of this invention, an absolutely sterile storage tank for beer or other liquid is provided which may be maintained sterile under all operating conditions with the special sterilizing and cleansing means, whereby before, during and after cleansing and sterilizing operations, neither the storage tank 14 nor any of the pipes and other connections and parts is opened to the atmosphere, so that there can be no contamination from the outside air. Also, all cleansing and sterilizing operations are conducted without the use of unsanitary brushes, cleaning compounds, or other extraneous apparatus which might carry infectious matter, nor do the hands of the operators engage any parts which are likely to contact the beer or other medium entering the storage tank 14. Accordingly, sterile beer or other sterile liquid entering the tank 14 remains sterile and is not contaminated during its course in and out of the tank. Thus, sterile beer entering the tank may be kept therein for an indefinite period without spoiling and is then conducted under sterile conditions to the filling and sealing machine 44, which encloses it in sterile condition in sterile containers.

While the new storage tank and sterilizing and cleansing means therefor has been described as especially adapted for use in breweries and the like, it is equally applicable for use in wine, spiritous liquor, and non-alcoholic beverage manufacture, and the like, and, although a preferred embodiment of the invention has been illustrated and described herein, the invention is not limited thereby, but is susceptible of changes in form and detail within its scope.

The term "cleansing" as used in the appended claims also comprehends sterilization.

We claim:

1. In apparatus of the type described, the combination of a container having an opening, a valve element in said opening having a hollow projection within said container, said projection having nozzle apertures, means for simultaneously adjusting said projection and actuating the valve element to predetermined positions to open and close the container opening, and means for supplying a cleansing fluid under pressure to the interior of said projection when the valve element is in said open position for distribution through the nozzle apertures for forceful impingement against the interior surfaces of said container.

2. In apparatus of the type described, the combination of a container having an opening, a valve element in said opening having a hollow projection within said container, said projection having nozzle apertures, means for bodily moving said projection and valve element to open and close the container opening, and means for supplying a cleansing fluid under pressure to the interior of said projection when the valve element is in open position for distribution through the nozzle apertures thereof for forceful impingement against the interior surfaces of said container.

3. In apparatus of the type described, the combination of a container having an opening, a valve element in said opening having a hollow projection within said container, said projection having nozzle apertures, means for simultaneously rotating said projection and valve element to open and close the container opening, and means for supplying a cleansing fluid under pressure to the interior of said projection when the valve element is open for distribution through the nozzle apertures thereof for forceful impingement against the interior surfaces of said container.

4. In apparatus of the type described, the combination of a container having an opening, a valve element in said opening having a hollow projection within said container, said projection having nozzle apertures, means for supplying a cleansing fluid under pressure to the interior of said projection for distribution through the nozzle apertures thereof for forceful impingement against the interior surfaces of said container, and means for moving said valve element and projection during the cleansing operation.

5. In apparatus of the type described, the combination of a container having an opening, a valve element in said opening having a hollow projection within said container, said projection having nozzle apertures, means for supplying a cleansing fluid under pressure to the interior of said projection for distribution through the nozzle apertures thereof for forceful impingement against the interior surfaces of said container, and means for simultaneously rotating the projection and valve element to open and close said container opening.

6. In apparatus of the type described, the combination of a container having an opening, a valve element controlling said opening, a spray nozzle projecting into said container and carried by said valve element, means for jointly adjusting said nozzle and valve element, and means for supplying a cleansing fluid under pressure to said nozzle when said valve element is open to forcibly spray the interior surfaces of said container.

7. In apparatus of the type described, the combination of a container having an opening, a valve element controlling said opening, a spray nozzle projecting into said container and carried by said valve element, means for jointly adjusting said nozzle and valve element, and means for supplying a cleansing fluid under pressure to said nozzle when said valve element is open to forcibly spray the interior surfaces of said container.

8. In apparatus of the type described, the combination of a container having an opening, a valve element controlling said opening, a spray nozzle carried by said valve element and projecting into said container, said nozzle having drain ports communicating with said valve element, means jointly actuating said valve element and nozzle for closing said ports, and means for supplying a cleansing fluid under pressure to said nozzle when the ports are closed and the valve element is open to forcibly spray the interior surfaces of said container.

9. In apparatus of the type described, the combination of a container having an opening, a valve element controlling said opening, a spray nozzle carried by said valve element and projecting into said container, said nozzle having drain ports communicating with said valve element, common means for simultaneously opening said valve element and closing said ports, and means for supplying a cleansing solution under pressure to said nozzle when the ports are closed and the valve element is open to forcibly spray the interior surfaces of said container.

10. In apparatus of the type described, the combination of a container having an opening, a valve controlling said opening, a spray nozzle projecting into said container, said nozzle having drain ports communicating with said valve, means for rotating said nozzle to close said ports, and means for supplying a cleansing fluid under pressure to said nozzle when the ports are closed and the valve is open to forcibly spray the interior surfaces of said container.

11. In apparatus of the type described, the combination of a container having an opening, a valve element controlling said opening, a spray nozzle projecting into said container and carried by said valve element and having drain ports controlled by the position of said valve element, means for operating said valve element and thereby controlling said ports, and means for supplying a cleansing fluid under pressure to said nozzle to forcibly spray the interior surfaces of said container.

12. In apparatus of the type described, the combination of a substantially cylindrical closed container, a bottom opening therefor, a valve disc cooperating with a seat for controlling the bottom opening, a tubular stem carried by the valve disc and projecting through the opening into the container, said stem having ports controlled by the axial position of the valve disc, means for moving the valve disc and the stem axially to control the valve opening and the port opening, a spray head for the stem, and means for supplying a sterilizing liquid under pressure to the spray head for forceful impingement against the interior surfaces of the container when the valve is open and the ports are closed.

HAROLD E. RUE.
RAYMOND N. BOSTOCK.